J. GOODRICH & H. J. COLBURN.
Improvement in Self-Oiling Pulleys.

No. 114,129. Patented April 25, 1871.

Witnesses,
R. D. O. Smith
P. C. Lyons

James Goodrich,
Henry J. Colburn,
By their Attorney,
J. S. Brown.

United States Patent Office.

JAMES GOODRICH AND HENRY J. COLBURN, OF FITCHBURG, MASSACHUSETTS.

Letters Patent No. 114,129, dated April 25, 1871.

IMPROVEMENT IN SELF-OILING PULLEYS.

The Schedule referred to in these Letters Patent and making part of the same.

*To all whom it may concern:*

Be it known that we, JAMES GOODRICH and HENRY J. COLBURN, of Fitchburg, in the county of Worcester and State of Massachusetts, have invented an Improved Self-Oiling Pulley; and we do hereby declare that the following is a full and exact description thereof, reference being had to the accompanying drawing making part of this specification—

Figure 1:
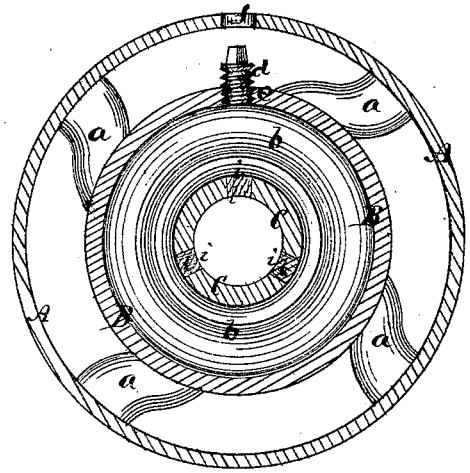
Figure 2:
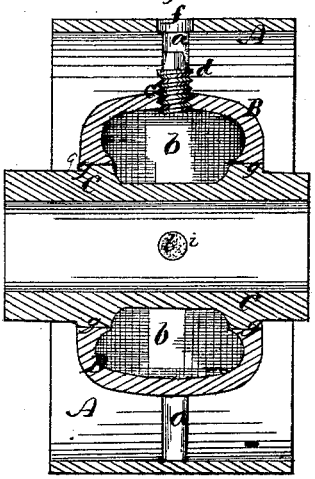

Figure 1 being a transverse section of the improved pulley;

Figure 2, a central section thereof in the line of its axis.

Like letters designate corresponding parts in both figures.

Let A represent the periphery of the pulley, and B a hollow hub within the same, and suitably connected therewith by spokes *a a* or otherwise.

Within the hub B is the oil-cavity *b*, to which the oil is supplied when required through a hole, *c*, closed by a stopper, *d*, and through an aperture, *f*, in the periphery of the pulley, opposite to the hole *c*.

Our improvement consists in a tubular bush, C, of peculiar construction, and connected with the oil-cavity *b* in a peculiar manner, substantially as follows:

The tubular bush C extends through the center of the hollow hub B and closes inwardly its oil-cavity *b*.

For this purpose the bush has two annular projections or rings, *g g*, raised above its general surface, to fit into the side apertures of the hub B; and these annular projections or raised rings have their outer surfaces somewhat conical or tapering, and closely fit the corresponding form and sizes of the hub apertures so as to perfectly close the same and hold the bush firmly in place.

One aperture is a little larger in diameter than the other, so that the smaller bush projection of the other aperture may pass freely through it when inserting the bush.

The bush is simply driven tightly into place and requires no other fastening, and it can be readily driven out at any time for replacing or for any other purpose.

The bush thus entirely closes the oil-cavity *b*; and, in order to supply the oil to the shaft automatically and without waste, radial openings *i i* are made through the sides of the bush, and are stoppered with wooden plugs *l l*, which transmit the oil very slowly through its pores, but sufficiently to keep the bearing oiled.

Plugs of other porous but firm material, such as leather, may be used instead of wood, which, however, we believe to be the most suitable substance for this use.

This construction produces the cheapest, most convenient, most practicable, and altogether the best self-oiling pulley ever invented.

The same construction is applicable for self-oiling journal-boxes.

What we claim as our invention, and desire to secure by Letters Patent, is—

1. The combination of a pulley having an oil-cavity, *b*, in its interior, with a tubular bush, C, fitting the interior of the pulley so as to close the oil-cavity therein, and provided with radial holes *i i*, stopped with wooden plugs or equivalent porous material, for transmitting oil from the oil-cavity to the shaft, substantially as herein specified.

2. The construction of the oil-transmitting bush C with its raised and tapering or slightly conical annular projections *g g* to fit corresponding apertures in the hub of the pulley, substantially as and for the purpose herein specified.

JAS. GOODRICH.
H. J. COLBURN.

Witnesses:
J. S. BROWN,
T. C. DAY.